US008738678B2

(12) United States Patent
Williams

(10) Patent No.: US 8,738,678 B2
(45) Date of Patent: May 27, 2014

(54) METHODS AND SYSTEMS FOR DETERMINING AN ENHANCED RANK ORDER VALUE OF A DATA SET

(75) Inventor: Darin S. Williams, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 455 days.

(21) Appl. No.: 13/232,825

(22) Filed: Sep. 14, 2011

(65) Prior Publication Data
US 2012/0002876 A1 Jan. 5, 2012

Related U.S. Application Data

(63) Continuation-in-part of application No. 12/608,374, filed on Oct. 29, 2009, now Pat. No. 8,416,986.

(51) Int. Cl.
G06F 17/10 (2006.01)
(52) U.S. Cl.
USPC .......................... 708/300; 382/190; 382/260
(58) Field of Classification Search
None
See application file for complete search history.

(56) References Cited

U.S. PATENT DOCUMENTS

| | | | |
|---|---|---|---|
| 4,439,940 | A | 4/1984 | Deryk |
| 4,441,165 | A | 4/1984 | Coleman et al. |
| 4,456,968 | A | 6/1984 | Carter et al. |
| 4,513,440 | A | 4/1985 | Delman |
| 4,560,974 | A | 12/1985 | Coleman et al. |
| 4,603,430 | A | 7/1986 | Sacks |
| 4,677,465 | A | 6/1987 | Alkofer |
| 4,739,401 | A | 4/1988 | Sacks et al. |
| 5,471,240 | A | 11/1995 | Prager et al. |
| 5,644,508 | A | 7/1997 | McNary et al. |
| 5,903,659 | A | 5/1999 | Kilgore |
| 6,111,975 | A | 8/2000 | Sacks et al. |
| 6,747,697 | B1 | 6/2004 | Lin et al. |
| 6,792,162 | B1 | 9/2004 | Edgar |
| 6,915,021 | B2 | 7/2005 | Cannata et al. |

(Continued)

FOREIGN PATENT DOCUMENTS

WO 0115085 A1 3/2001
WO 2011053394 A1 5/2011

OTHER PUBLICATIONS

European Patent Office, International Searching Authority, "Annex to Form PCT/ISA/206 Communication Relating to the Results of the Partial International Search," mailed Sep. 20, 2010; International Application No. PCT/US2010/040071, filed Jun. 25, 2010.

(Continued)

Primary Examiner — Michael D Yaary
(74) Attorney, Agent, or Firm — Eric A. Gifford

(57) ABSTRACT

The value of a median or other rank of interest in a dataset is efficiently determined. Each active bit of the dataset is serially processed to compute one bit of the output value from each bit of the input dataset. If any sample in the dataset has an active bit that differs from the determined output value for that bit, then that sample can be marked as no longer in consideration. After an active bit has been processed, the data for that bit may be discarded or subsequently ignored. These techniques allow the rank value to be efficiently determined using pipelined logic in a configurable gate array (CGA) or the like. Further implementations may be enhanced to compute clipped means, to identify "next highest" or "next lowest" values, to reduce quantization errors through less-significant bit interpolation, to simultaneously process multiple values in a common pipeline, or for any other purpose.

32 Claims, 11 Drawing Sheets

(56) References Cited

U.S. PATENT DOCUMENTS

| | | |
|---|---|---|
| 6,965,702 B2 | 11/2005 | Gallagher |
| 7,221,785 B2 | 5/2007 | Curry et al. |
| 7,643,676 B2 | 1/2010 | Malvar |
| 2002/0122354 A1 | 9/2002 | Williams et al. |
| 2004/0173735 A1 | 9/2004 | Williams et al. |
| 2005/0213845 A1 | 9/2005 | Avinash et al. |
| 2006/0049974 A1 | 3/2006 | Williams |
| 2007/0040061 A1 | 2/2007 | Williams |
| 2008/0031629 A1 | 2/2008 | Nguyen et al. |
| 2008/0056606 A1 | 3/2008 | Kilgore |
| 2008/0112594 A1 | 5/2008 | Williams et al. |
| 2008/0204731 A1 | 8/2008 | Williams |
| 2008/0205785 A1 | 8/2008 | Geiger et al. |
| 2009/0001214 A1 | 1/2009 | Williams et al. |
| 2009/0046902 A1 | 2/2009 | Williams et al. |
| 2009/0078817 A1 | 3/2009 | Williams |
| 2009/0103776 A1 | 4/2009 | Williams et al. |
| 2011/0103692 A1 | 5/2011 | Williams |

OTHER PUBLICATIONS

Kutiyal, D. S. "Sitaro (Satellite Image Target Analysis and Retrieval of Objects) for Defense Application," Jan. 1, 2008, pp. 1-153, XP007914633; retrieved from the Internet: URL:http://www.facweb.iitkgp.ernet.in/{pabitra/facad/06CS6027t.pdf} [retrieved on Aug. 30, 2010], p. 4, section 1.2, figure 1.4.

Anonymous: "Derivative" Wikipedia, Oct. 23, 2009, pp. 1-17, XP002598674; retrieved from the Internet: URL:http://en.wikipedia,org/w/index.php?title=Derivative&oldid=321604843 [retrieved on Aug. 30, 2010], pp. 3-4, section "Definition via difference quotients".

Anonymous: "Median Filter" Wikipedia, Aug. 31, 2009, pp. 1-3, XP002598675; retrieved from the Internet: URL:http://en.wikipedia.org/w/index.php?title=Medianfilter&oldid=311102726 [retrieved on Aug. 30, 2010], p. 1, paragraph 1, p. 1-2, section "Example".

Karaman M. et al. "New Radix-2-Based Algorithm for Fast Median Filtering" electronics Letters, IEEE Stevenage, GB, vol. 25, No. 11, May 25, 1989, p. 723/724, XP000121350; ISSN: 0013-5194, p. 724, left-hand column, paragraph 4-last paragraph.

Ataman E. et al. "A Fast Method for Real-Time Median Filtering" Transactions of the IRE Professional Group on Audio, IEEE Inc. New York, US, vol. 28, No. 4, Aug. 1, 1980, pp. 415-421, XP001160948, figures 1, 2, section II.

Piccardi M. Ed-Liu W. T. et al. "Background Subtraction Techniques: A Review" Systems, Man and Cybernetics, 2004 IEE International Conference on, IEEE, Piscataway, NJ, USA, vol. 4, Oct. 10, 2004, pp. 3099-3104, XP010773231; ISBN: 978-0-7803-8566-5, p. 3099, section 2.1, p. 3100, left-hand column, paragraph 2.

Elad et al. "Low Bit-Rate Compression of Facial Images" IEEE Transactions on Image Processing, vol. 16, No. 9, Sep. 1, 2007, pp. 2379-2383, XP007914649; retrieved from the Internet: URL:http://ieeesplore.ieee.org/xpls/abs_all.jsp?arnumber=4286990&tag=1 [retrieved on Aug. 31, 2010], p. 3780, section A, par. 2 "linear background model".

METHODS AND SYSTEMS FOR DETERMINING AN ENHANCED RANK ORDER VALUE OF A DATA SET

PRIORITY CLAIM

This application is a continuation-in-part of U.S. application Ser. No. 12/608,374 entitled "METHODS AND SYSTEMS FOR PROCESSING DATA USING NON-LINEAR SLOPE COMPENSATION" filed on Oct. 29, 2009, which is incorporated herein by reference.

GOVERNMENT RIGHTS

This invention was made with United States Government support under Contract Number HQ0276-08-C-0001 with the Missile Defense Agency. The United States Government has certain rights in this invention.

TECHNICAL FIELD

The following discussion generally relates to digital filtering techniques and systems. More particularly, the following discussion relates to a rank order filter that may be used to determine the value of a median or other particular rank of a data set.

BACKGROUND

A rank order filter identifies the value of a particular rank in a set of data. A median filter, for example, is one type of rank order filter identifies the value that is in the midpoint of a dataset; that is, the value that equally divides the remaining values in the set such that half are larger and half are smaller than the median value. Other rank order filters may be used to identify values at different ranks within the dataset (e.g., bottom 25%, top 25%, etc.), as desired.

Many different types of median and other rank order filters have been widely used over many years in a multitude of settings. In signal processing applications, for example, it is often desirable to be able to perform some kind of noise reduction on an image or signal. The median filter is one type of nonlinear digital filtering technique that is often used to remove noise. Since the median function is not concerned with the particular values of outlying data, the median function can be very effective at ignoring the effects of relatively large magnitude noise within the dataset. For this reason, median filtering is very widely used in digital image processing because, under certain conditions, the median function preserves image edges while removing noise from the image. Median filters, as well as other types of rank order filters, are widely used in other applications as well.

Most current rank order filters, however, can demand relatively significant computing resources to provide accurate results within the time frames needed for certain applications. In particular, it can be computationally challenging to implement a rank order for a relatively large dataset, particularly using field programmable gate arrays or similar hardware logic devices. It is therefore desirable to provide a rank order filter that reliably yet efficiently identifies the value of a particular rank in a data set, such as the median value. These and other desirable features and characteristics will become apparent from the subsequent detailed description and the appended claims, taken in conjunction with the accompanying drawings and this background section.

BRIEF DESCRIPTION

Methods and systems are described to determine the value of a median or other rank of interest in a set of data samples. In various exemplary embodiments, each active bit of the data is sequentially processed to compute one output bit of the output value. The output bit is suitably determined for each active bit by comparing a count of the data samples having a particular value with the relative number of the rank being sought. If the comparison determines that the output for that active bit is the same as the particular value, then all data samples having a different value for the active bit can be excluded from further consideration. Although the various techniques and systems may be implemented in any manner, various embodiments allow the value of a median or other rank of interest to be determined efficiently using a field programmable gate array (FPGA) or other specialized hardware.

Various embodiments provide methods executable by data processing hardware to find an output value of a desired rank in a set of data samples, wherein each of the data samples comprises a set of digital bits each having either a first value or a second value. The exemplary method suitably includes the steps of receiving each of the data samples in the data set at the data processing hardware computing one bit of the output value for each active bit in the set of digital bits. The computing performed for each active bit suitably comprises determining the active bit of the output value based upon a comparison of the desired rank with a count of the data samples having the first value, excluding all data samples having the second value for the active bit from further consideration if the comparison indicates that the active bit of the output value is the first value, and adjusting the desired rank to exclude all data samples having the first value for the active bit from further consideration if the comparison indicates that the active bit of the output value is the second value. After computing the output bits for each active bit, outputting the output value from the output bits computed for each active bit.

Other embodiments provide computational systems to find an output value of a desired rank in a set of data samples, wherein each of the data values comprises a set of digital bits each having either a first value or a second value. The system suitably comprises an output interface and data processing circuitry configured to receive the set of data samples and to compute the output value to include one output bit from each active bit in the set of digital bits. The computing suitably comprises, for each of the active bits, determining a count of the number of data samples that remain in play and that have the active bit equal to the first value. If the count is not less than the desired rank, the providing the second value as the output bit for the active bit and treating each of the data samples having the active bit equal to the first value as no longer in play. If the count is less than or equal to the desired rank order, providing the first value as the output for the active bit, treating each of the data samples having the active bit equal to the second value as no longer in play, and adjusting the desired rank to account for the data samples that are no longer in play. The output value is then provided from the output bits provided for each active bit via the output interface.

The various implementations may be enhanced or modified in many different ways to create any number of equivalent embodiments. Various other embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and FIG. 1 is a block diagram of an exemplary data processing system that implements certain types of rank order filters;

FIGS. 2A-B are flowcharts showing exemplary processes for finding an output value of a particular rank of a dataset;

FIGS. 3A-B show examples of how multi-stage processing can be used to find a value of a desired rank within a set of data samples;

DETAILED DESCRIPTION

Figure 1:
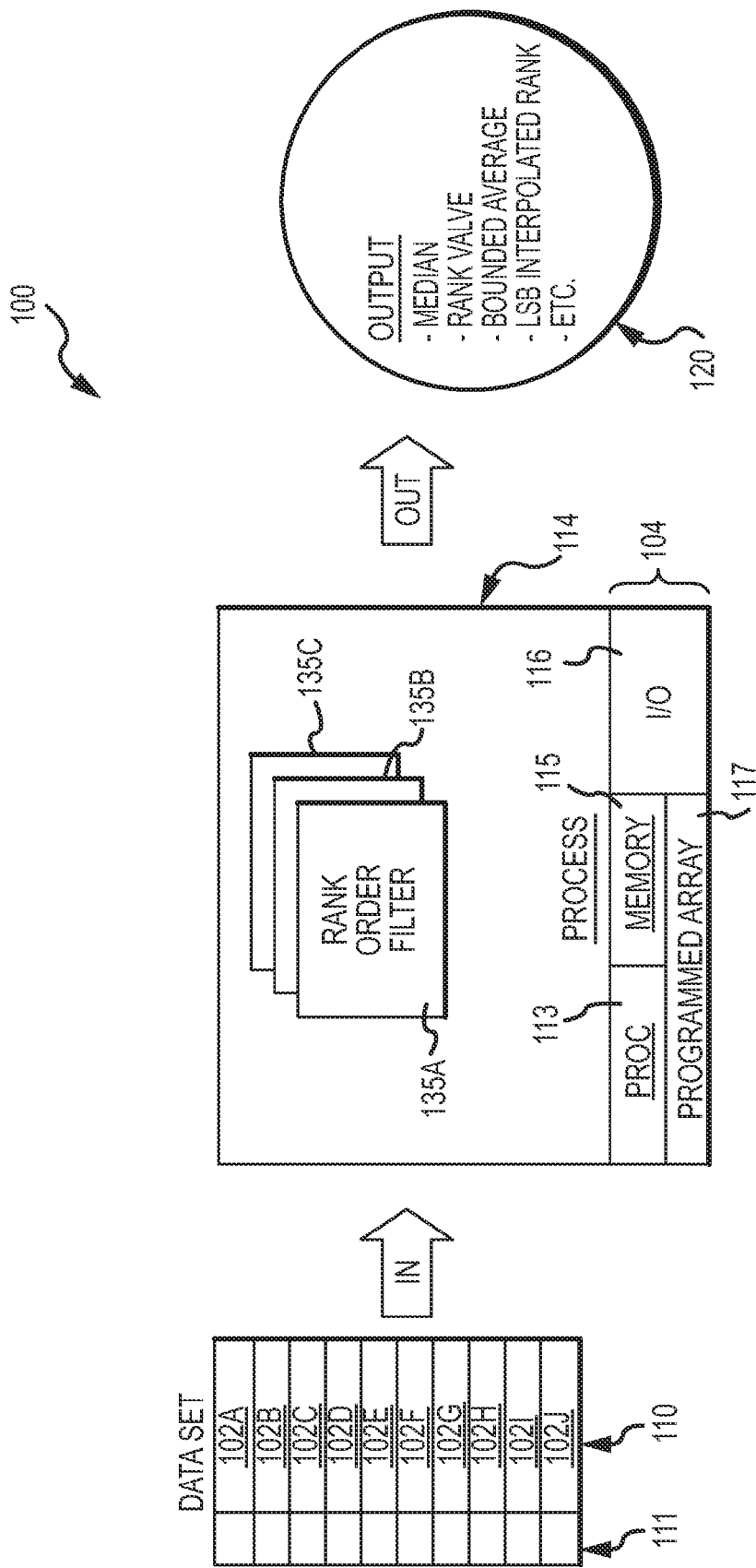

The following detailed description is merely exemplary in nature and is not intended to limit the invention or the application and uses of the invention. Furthermore, there is no intention to be bound by any theory presented in the preceding background or the following detailed description.

According to various embodiments, a rank order filter is provided to efficiently yet accurately find the value of a median or other desired rank in a set of digital data. The filter iteratively processes a set of data samples using a series of processing stages, with each stage determining one bit of the output value from a single "active" bit of the data. The "active" bit is typically the most significant bit that has not been previously processed. Generally speaking, the processing performed on each bit involves comparing the effective number of the desired rank with the number of data samples that remain in consideration and that have a particular value (e.g., "zero") for the most significant active bit. If the number of still-in-play data samples having the particular value does not exceed the effective rank number, then the output for that bit is the particular value. Otherwise, the output for that active bit will be the opposite of the particular value. Any data samples that do not match the output value at any stage can be excluded from further consideration, thereby reducing the amount of data considered in subsequent processing.

The various processing stages used to determine the rank order value may be very efficiently pipelined for implementation in field programmable gate arrays (FPGAs) or similar hardware. Typically, each bit of the input data set is processed separately in a series of pipelined hardware stages, with subsequent stages having no need to reconsider the values of previously-processed bits. As a result, the active bit data for each data sample can be discarded (or ignored) in subsequent processing stages. Additionally, as data samples are identified as having different bit values than the output value, those samples are removed from further consideration in subsequent stages. This significantly reduces the number of gates needed for later processing stages. Even further, many implementations allow for efficient sharing of the processing pipeline so that multiple rank values, "next largest" or "next smallest" values, cumulative sums and/or other values may be determined simultaneously.

The exemplary embodiments presented herein may be enhanced or modified in many ways to suit a wide array of purposes. To provide just a few examples, the iterative nature of the rank order filter allows for very efficient computation of a "next highest" or "next lowest" value. These values may be used as an integrity check, for example, or for any other purpose. Some embodiments may mathematically combine the output rank value with the "next highest" or "next lowest" value to compute a more accurate output value, particularly if the data set contains an even number of samples (e.g., the median of an even-numbered list of ranks would mathematically fall between two ranks; averaging the two values from opposite sides of the median would therefore provide a more accurate output). Additional details about various embodiments, enhancements and modifications are described in increasing detail below.

Some embodiments may alternately or additional provide for efficient interpolation of the least significant bit output, thereby greatly improving the results of the filter without substantial additional processing. As described more fully below, interpolation of the least significant bit can be used to reduce the effects of quantization errors, thereby effectively providing better noise elimination without substantial additional data processing resources.

Still other embodiments may use the general concepts described herein to maintain an efficient cumulative sum of the values that are below the desired rank order (e.g., a "sum to rank" filler). This cumulative sum can enable a very useful and effective filter that computes an average of only those values in the data set that lie between two specified ranks (e.g., between 25% and 75%, or any other desired values). This allows extreme or outlying values to be readily excluded from the average, while still providing the benefits of an averaging filter. Any number of other benefits and features may be provided in many different alternate but equivalent embodiments.

The various systems and techniques described herein may find use in any number of settings. For convenience, the following discussion may emphasize image and signal processing applications, such as those used in identifying objects in digital images. Equivalent systems and techniques, however, may be applied in any other setting that uses signal processing, image enhancement, background smoothing and/or other processing. Moreover, the particular parameters described herein (e.g., mathematical or logical values, values of constants, sizes and shapes of data sets, and/or the like) are purely exemplary. Indeed, the simple application of conventional digital logic principles could produce a wide array of equivalent embodiments. For example, references such as "determining if the number of zeros is greater than a threshold" may, in some situations, be equivalently recast using conventional logical constructs as "determining whether a number of ones is less than the threshold". Similar modifications may be made to much of the particular digital logic described herein. Many other implementations and embodiments may use any number of different but equivalent values, algorithms and/or other parameters as desired.

Turning to the drawing figures and with reference now to FIG. 1, an exemplary system 100 for processing a data set no having any number of data values 102A-J suitably includes an appropriate data processing system 114 that provides output (s) 120, as desired. Generally speaking, data processing system 114 applies one or more rank order filters 135A-C to the input dataset 110 to identify the value of a median or other rank in the dataset no, or any other outputs 120 that may be determined using the rank order filter(s) 135A-C as desired. A bounded average of the values 102 in dataset no lying between two identified ranks, for example, could be efficiently calculated and provided as an output 120 in some embodiments.

Dataset 110 is any grouping or collection of data samples 102A-J that can be processed within system 100. Data samples 102A-J in dataset no may each represent sample values associated with any measured, computed or other quantity, for example. As mentioned above, rank order filters 135A-C are widely used in processing signal and image data, such as pixel intensities of digital images. Equivalent embodiments, however, could be formulated that use any sort of data collection, processing and/or output features that are appropriate to different types of sampled data 110 other than digital imagery. The various systems and techniques described herein could be equivalently used to process samples 102A-J representing data of any sort, such as RF signals, measurements of any environmental or industrial condition (e.g., temperature, pressure, humidity, or other conditions), time series data and/or any other type of data as desired. Further, data processing in some embodiments may be performed on multiple datasets 110 in any manner. Data samples from separate datasets no may be inter-combined, for example, as desired.

Processing system 114 implements one or more rank order filters 135A-C in any manner. As noted in greater detail below, various embodiments use iterative bitwise processing to sequentially identify output bits of a particular data value 102-I that corresponds to a median or other desired rank of dataset no. The iterative processing may be pipelined or otherwise implemented in a manner that makes efficient use of hardware and/or software resources. Various embodiments may simultaneously or otherwise execute multiple rank order filters 135A-C on a common dataset no, since the various techniques do not disturb the dataset no during processing. Moreover, a set of delay lines or other input signals can be shared between multiple rank calculations, as described in more detail below. This allows for much more compact processing than most conventional techniques since a common set of input data arriving on a single set of input lines can be simultaneously processed to arrive at multiple rank values, if desired.

To that end, many of the techniques described below simply append (or otherwise associate) one or more data flags 111 to each data value 102A-J to indicate whether the value 102 remains in consideration for further processing ("in play"), and/or to otherwise indicate the status of the particular value 102 for subsequent processing. Various embodiments may use data flags 111 to indicate any number of different states in any manner, as described more fully below. Examples of some of these states might include, for example: "in play", "next highest", "out of play high", "out of play low", and/or the like. Since the data states are indicated using the data flags in, there is typically no need to destroy or otherwise modify the input data itself. This non-destructive feature can allow the common input received at one set of delay lines to be propagated throughout multiple rank filters. Since each rank filter simply uses additional bits to track the state of the data as it propagates through the filter, multiple rank filters (each with its own state bits) can simultaneously process the same input data. This concept may be modified and/or expanded as desired.

Processing system 114 is any data processing system that includes appropriate hardware, software, firmware and/or combination thereof for processing dataset no as described herein. In various embodiments, processing system 114 is at least partially implemented in software or firmware that can be stored in any conventional memory 118 or mass storage, and that can be executed on any conventional processor 113.

To that end, processing module 114 may be implemented in this example using a personal computer, workstation or the like that is based upon general purpose computing hardware 104 and that executes software in any format. In other embodiments, processing module 114 is partially or entirely implemented using specially-designed processing, data storage and/or other circuitry 117, such as any sort of hardware designed for deployment in aerospace, maritime, industrial, battlefield and/or other demanding environments. In various embodiments, certain features of processing module 114 are partially or entirely implemented using programmable logic devices 117 such as any sort of field programmable gate array (FPGA) or other configurable gate array (CGA), application specific integrated circuit (ASIC), programmed array logic (PAL), and/or the like. Any number of equivalent embodiments may be designed and implemented using any sort of hardware 104, software, firmware and/or other digital processing logic as desired.

Data processing system 114 also includes appropriate input/output features 116 to receive manual or automated data inputs, and to provide output 120 as desired. Data may be input from a data acquisition module of any sort (e.g., an interface to a camera, radio receiver, sensor or the like), or from any other source. I/O features 116 may also allow outputs 120 to be provided to a data network (e.g., via a conventional network interface), to a display, to a data file in any format stored on data processing system 114 or elsewhere, to a separate computing system or process executing on data processing system 114 or elsewhere, and/or to any other human or automated recipient, as desired.

Generally speaking, then, data processing system 114 includes appropriate hardware 104, software and/or firmware to implement one or more rank order filters 135A-C. Each filter 135A-C suitably receives a dataset 110 of values 102A-J from any internal or external source, processes the dataset no to identify a value of a particularly-desired rank, and provides the identified value as an output 120. Additional details of several exemplary embodiments are provided below.

Figure 2A:
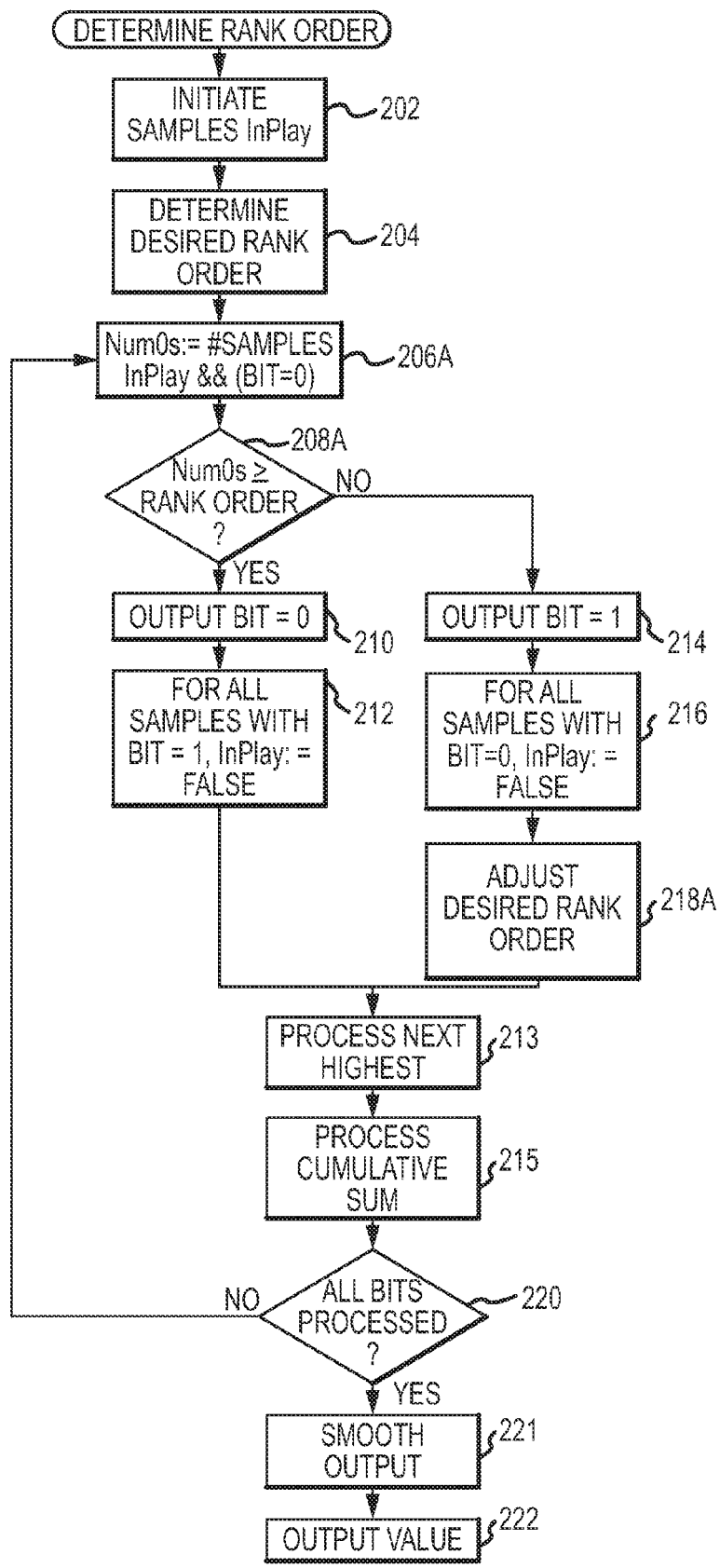
Figure 2B:
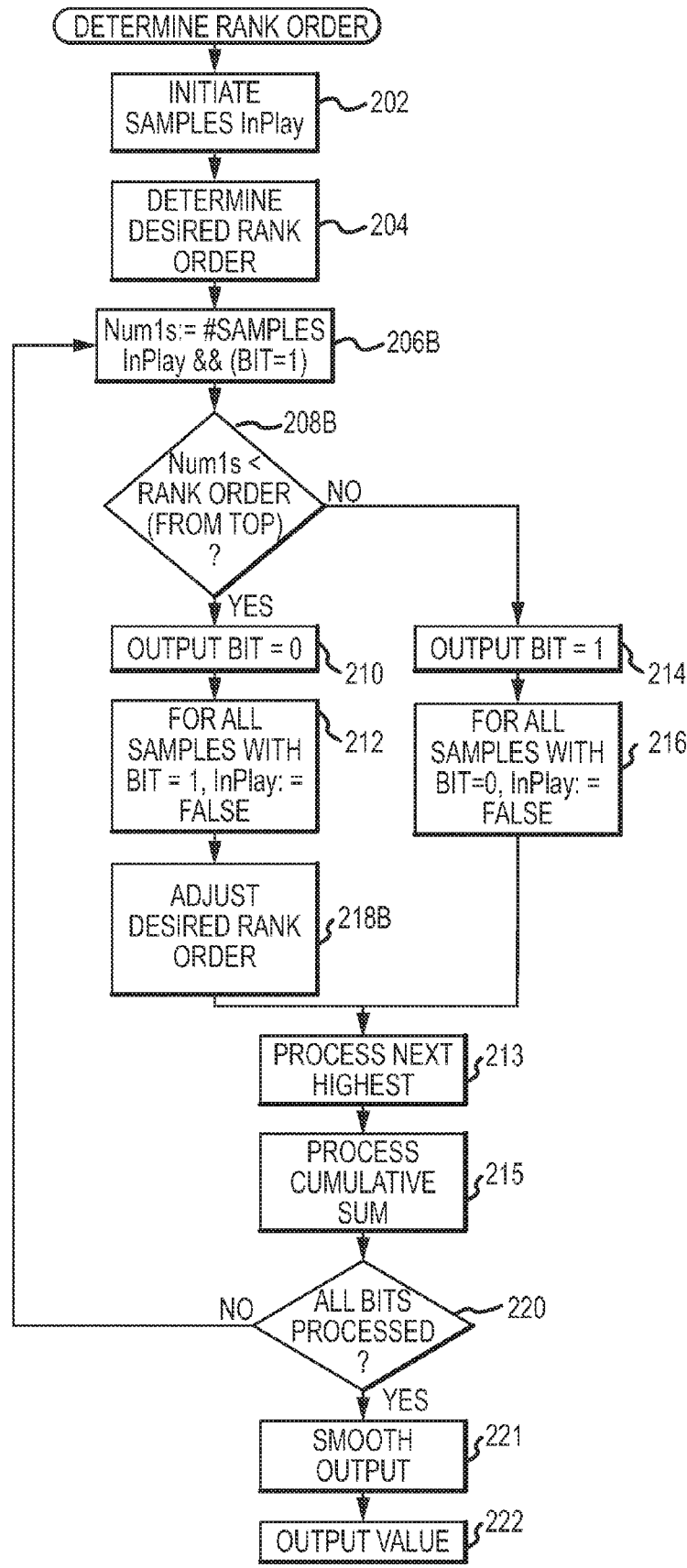

FIGS. 2A and 2B show two exemplary processes 200, 201 (respectively) for determining a rank order value from a set 110 of data samples 102A-J, appropriate. FIG. 2A describes a process 200 in which the number of "zero" values is evaluated for each active bit in the data set, and FIG. 2B shows an equivalent process 201 in which "one" values are evaluated. Each process 200, 201 can be readily implemented in hardware using a very efficient number of logic gates, or that can be efficiently executed in software or firmware, as desired. Note that the particular techniques described in FIGS. 2A-B could be used in any application in which a median or any other rank order value is desired.

As shown in FIGS. 2A-2B, processes 200, 201 for determining one or more rank order values suitably include the broad steps of initializing each of the samples to identify samples that are still in consideration ("in play") for further processing (function 202) and identifying the desired rank order of the desired value (function 204). A bit analysis routine is then repeated (functions 206-220) for each of the active bits in the samples to identify the desired rank, as described more fully below.

The repeated stages 206-220 may be readily pipelined for simultaneous execution in some embodiments to create a relatively efficient hardware or software implementation. That is, various iterations of looping 206-220 may be carried out at least partially simultaneously using parallel hardware 104, software and/or other logic so that results can be obtained relatively quickly.

Processes 200, 201 begin after the dataset 110 is received at a processing device 114 as appropriate. As noted above, data values 102A-J may represent any sort of data, and may be received from any source that is internal and/or external to processing device 114. Process 200 is generally hardwired or otherwise initialized with a data word length, or another indicator of the number of digital bits in each data value 102A-J. Typically, stages 206-220 will be repeated for each data bit, although other embodiments may be differently configured as desired. Some implementations may not consider all of the least significant bits, for example, if an approximation of the desired rank value is sufficient for the particular application.

Function 202 illustrated in FIGS. 2A-2B initially identifies all of the data samples 102 to be processed as "in consideration", or "in play". "In consideration" or "in play" in this sense simply reflects that the sample value has not yet been determined to be above or below the desired rank, so further processing on the data sample 110 is warranted. Samples may be indicated as "in play" by simply setting a bit or other flag in that is associated with the particular value 102, as appropriate. In various embodiments, the "in play" data set may exclude any samples 102 that are intentionally excluded. Samples resulting from defective pixels in an image processing application, for example, could be readily excluded by simply indicating that the samples 102 associated with the defective pixels are no longer "in play", and the adjusting the desired rank to account for the excluded samples 102. Other samples 102 could be initially identified as "not in play" for any other reason to conveniently exclude these values from further processing, as desired.

Initialization may also include determining the rank order of the desired value (function 204). The desired rank may be expressed with reference to the lowest value ("the bottom") of the dataset no, with respect to the greatest value ("the top") of dataset no, or with regard to any other reference. The desired rank order may be hard-coded into some implementations, although other implementations may be configurable as desired. In some embodiments, the rank order of the desired value is simply the central median value of an ordered list (e.g., the eighth sample in a seventeen-sample list), which can be readily determined by simply counting the number of samples that will be processed (ignoring, if appropriate, any values excluded from processing, e.g., any "dead pixels" or other values excluded by mask 302). This number of samples to be processed may correspond to the number of samples that are initially in play, as desired. When an even number of samples is present, the rank order of a median may be initially assumed to be the lower of the two central values (e.g., to accommodate for any upward bias created by clutter points or the like) in some implementations. Alternatively, the upper value could be used, or the two central values could be averaged or otherwise processed as desired. Any indication of the rank order that is to be sought could be used in any number of alternate embodiments. Process 200 is not limited to computation of median values, then, but rather could be used to identify any rank that may be desired. Further, process 200 may be used to simultaneously identify multiple rank values, with each desired rank having an associated set of "in play" flags and associated rank order registers.

Functions 206-220 may be sequentially and iteratively repeated for each of the digital bits used to represent the sample values, beginning with the most significant bit (MSB) and proceeding to the least significant bit (LSB). If the samples are represented by sixteen-bit values, for example, the loop encompassing functions 206-420 may be repeated sixteen times, once for each bit. The bit that is considered during any particular iteration is typically the most significant bit that has not yet been processed; this bit is referenced herein as the "active bit". While some embodiments may repeat loop 206-220 for every bit in the data samples, other embodiments may simply execute the process for the most significant bits (e.g., the most significant eight bits), or in any other manner, as desired.

At the beginning of each iteration of the loop 206-220, a count is taken (function 206) of the number of samples that are both in play and that have an active bit value equal to a first value. In the example shown in FIG. 2A, the "first value" is a logic low ("0") value, although other embodiments could be equivalently created that would instead compare the bit of interest to a logic high ("1") value, as shown in FIG. 2B. In such cases, the sense of the rank may be specified from the opposite end of the list of values, and/or other modifications may be made as well.

This count 206 is then compared to the desired rank order to determine the value of the active bit in the desired sample (function 208). If the number of in play samples with an active bit equal to the first value exceeds the number of the desired rank order, then the value of the active bit in the desired sample must be equal to the first value (function 210). Conversely, if the number of in play samples with an active bit equal to the first value is less than the desired rank order, then the value of the active bit in the desired sample must be the opposite of the first value, that is, a "1" as illustrated in FIG. 2A (function 214).

FIG. 2B similarly shows that the number of ones remaining in play can be tracked (function 206B), and this number can be compared to an appropriate desired rank order value (function 208B). In the example of FIG. 2B, the desired rank may be expressed in relation to the greatest rank (e.g., "Xth rank from the top of the list"). If the desired rank is initially expressed in reference to the bottom of the list, then an adjusted desired rank may be computed in function 204 and/or function 208B based upon the total number of in play samples 102 and the particular rank being sought. Equivalent embodiments, however, may simply use different schemes for establishing the desired rank, as desired.

The samples that have active bits differing from the active bit of the desired value can be identified as no longer in play (functions 212, 216). In function 212 as illustrated in FIGS. 2A-B, for example, the active bit of the desired sample is determined to be a "0", so any samples with an active bit equal to "1" can be treated as no longer in play. Similarly, function 216 as illustrated in FIGS. 2A-B would change the "in play" settings of any samples that had an active bit value equal to "0" after it was determined that the desired sample has an active bit equal to "1". Subsequent iterations of loop 206-220 would therefore not need to consider samples that were flagged as no longer in play, thereby speeding the computations, and reducing the amount of circuitry needed to process subsequent stages.

Additionally, in the embodiments shown in FIGS. 2A-B, the rank order of the desired value may be adjusted (function 218) to account for the any samples that were changed to "not in play" in function 216. This adjustment reflects the position of the desired value within the samples remaining in play. In FIG. 2A, for example, function 218A shows that the desired rank is increased to reflect that samples 102 with a "zero" value will no longer be in play. FIG. 2A equivalently shows function 218B as decreasing the desired rank to reflect that samples 102 with a "one" value will no longer be in play. This adjustment of the While FIGS. 2A-B show functions 218A-B as adjusting the rank order value that was determined in function 204, equivalent embodiments may use a separate variable to represent the rank order in comparison 208 and in adjustment functions 218 so that the initially-determined rank order may be preserved for subsequent processing. Various embodiments, for example, could add an additional bit or other flag 111 to track whether each sample value taken out of play is deemed to be higher or lower than the desired rank. This additional flag 111 may obviate the need to adjust the rank order in function 218 in such embodiments.

Again, the particular logic values illustrated in FIGS. 2A-B could be readily toggled or otherwise logically adjusted in any number of equivalent embodiments. For example, some embodiments could adjust the "greater-than or equal" comparison shown in function 208A to be a "less than" comparison in which the "rank order" represents a count downward from the top of the list, rather than a count up from the bottom of the list as shown in FIG. 2A. In such cases, the rank adjustment function 218 would be performed in the loop that contains functions 210 and 212 rather than the loop that includes functions 214 and 216 as shown. Further, equivalent embodiments could count the number of ones instead of the number of zeros. FIG. 2B shows one example of a technique that tracks the number of ones. Generally speaking, then, the example shown in FIG. 2A determines the rank order value by counting zeros from the "bottom" of the dataset, whereas the example shown in FIG. 2B equivalently determines the rank order value by counting ones from the "top" of the dataset. Again, equivalent embodiments may count either zeros and/or ones from either the top and/or bottom of the dataset by simply selecting appropriate comparisons performed in functions 206 and 208 and adjustments in function 218. Many other different but equivalent embodiments could be formulated as desired.

Some embodiments may include additional or alternate features. For example, various embodiments suitably track a "next highest" or "next lowest" value (function 213) that may be useful in computing a blended median or other result. If dataset 110 contains an even number of ranks 102, for example, it may be desirable to average the values of two central ranks 102 to arrive at a median value rather than simply selecting between the two central ranks. Similar concepts may be applied to ranks other than the median as well. Additional detail about an exemplary "next highest" feature is provided below with respect to FIGS. 4-5, and other embodiments may use different techniques as desired.

Still other embodiments may alternately or additionally compute a cumulative sum (function 215) of the values 102 that are less than the rank of interest. This cumulative sum feature may be efficiently calculated within loop 206-220, and may be very useful in computing clipped median functions, bounded mean functions or similar functions that compute linear averages of values lying between two ranks, as described more fully below. An exemplary process to efficiently track cumulative sums within loop 206-220 is described below with respect to FIGS. 7-8.

After all of the desired bits are processed (function 220), the desired value may be output as desired (function 222). The desired value may be output 120 as an argument returned from a programming function, routine or other procedure in some implementations. Alternately, the desired value may be latched or otherwise output from a hard-wired digital logic circuit (e.g., a CGA, ASIC or the like) in other implementations. Other embodiments may provide the output value in any format using any sort of hardware, software, firmware and/or other logic, as desired.

Some embodiments may provide additional post-processing on the output 120, as desired. For example, some embodiments may interpolate or otherwise smooth the output 120 (function 221) to reduce the effects of input quantization or the like. Additional detail about an exemplary interpolation process is described below with respect to FIG. 6, although other embodiments may use other techniques as desired.

Generally speaking, each of the various steps in processes 200, 201 may be performed by computing hardware, firmware and/or software executing in any data processing environment. In an exemplary embodiment, some or all of these processes are implemented in software instructions that are associated with processing module 114 that can be stored in memory 118 or in any other mass storage, and that can be executed on processor 116. Other embodiments may be implemented in dedicated processing hardware, firmware and/or other means as desired, including any sort of common gate array, ASIC, or other programmed or programmable digital logic 117 as desired. The techniques described in FIG. 2 may be very efficiently implemented in CGA structures by using pipeline structures to implement the iterative multi-bit processing.

Figure 3A:
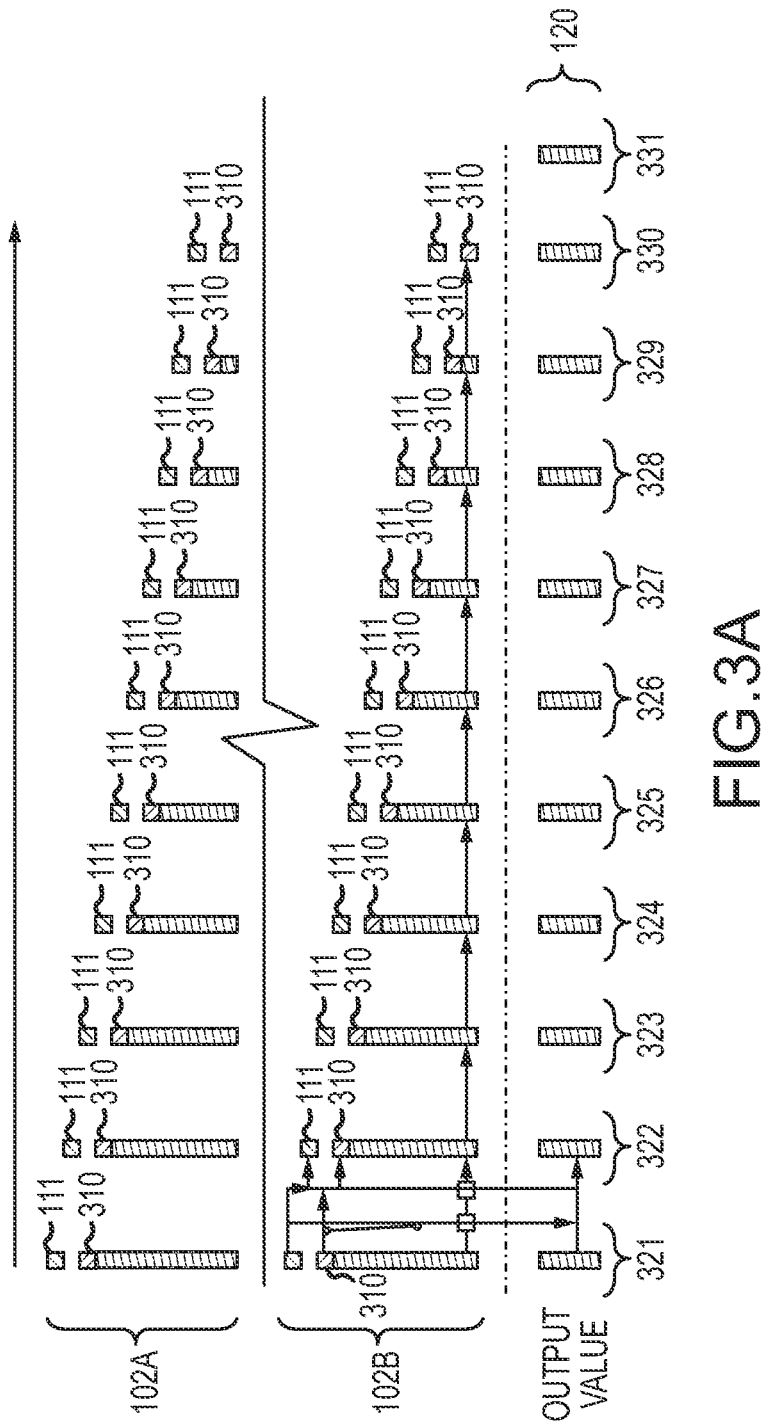
Figure 3B:
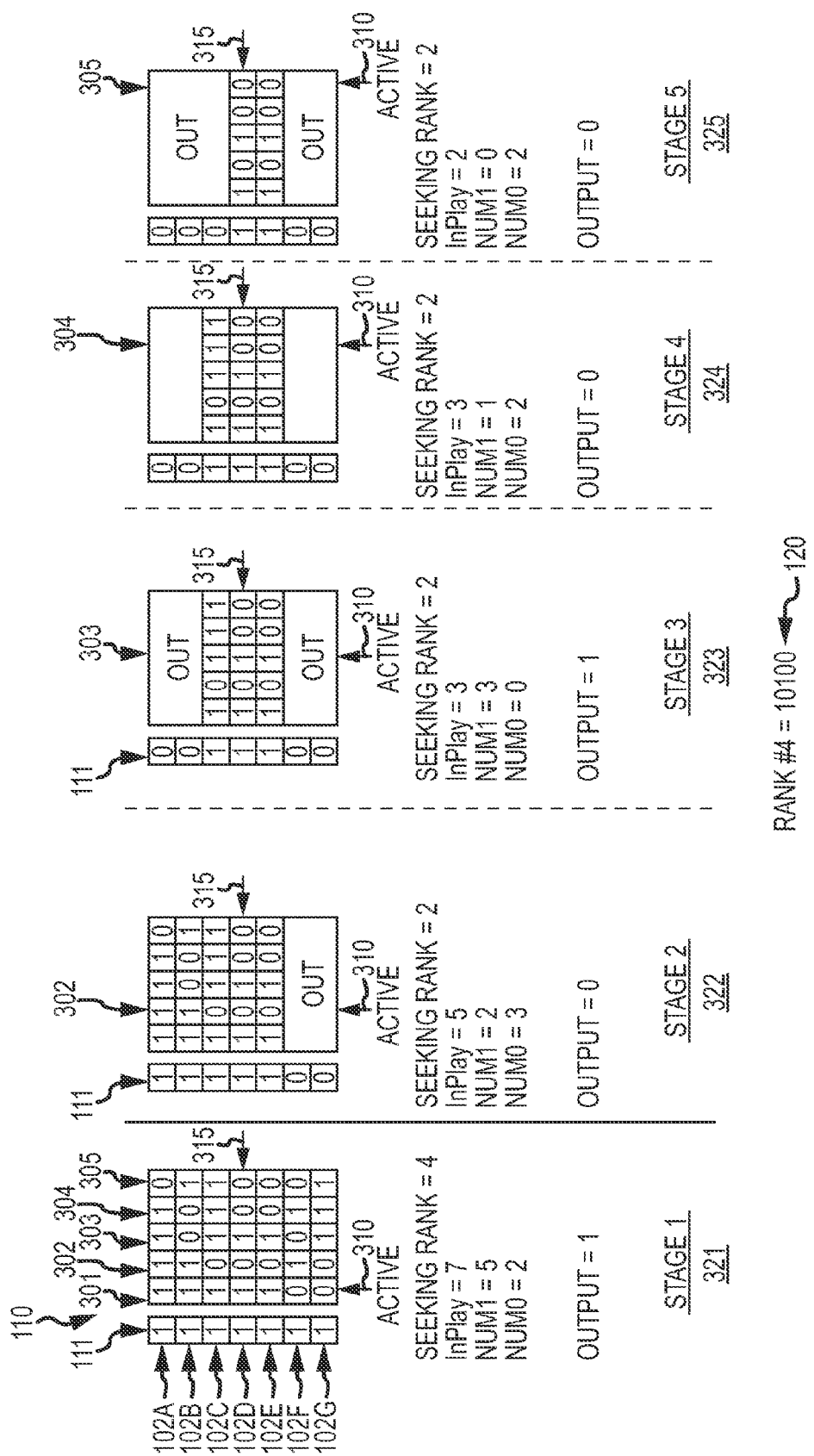

FIGS. 3A and 3B illustrate the "pipelined" nature in which a rank order value may be determined. With reference to FIG. 3A, a sort of "bit cascade" can receive any number of data samples 102A-B as an input, then process the data through a series of pipeline stages 321-331 in which each active bit of the data set is independently evaluated. Typically, processing begins with the most significant bit (MSB) in stage 321, and progresses through each stage until the least significant bit (LSB) is processed at stage 331. At each stage 321-331, one bit of the output value 120 is determined based upon a comparison of the currently-desired rank with a count of the data samples 102 having a particular value for the active bit 310. After the value of the output bit is determined, any data samples 102 that have active bit values that differ from the determined output value can be excluded from further consideration, and processing continues to the next stage. Processing then continues until all of the stages are complete, and the result can be provided as an output 120.

The pipeline structure shown in FIG. 3A can be readily implemented in configurable gate arrays (CGAs) or similar hardware. After a particular active bit has been evaluated, it does not need to be considered again in future stages, so the more significant bits can generally be discarded (or at least ignored) after they have been processed. This greatly reduces the number of logic gates needed to process the subsequent steps in comparison to the number that would be needed to process each bit at every stage.

Further, the data in each sample 102A-B does not need to be modified or destroyed at any particular processing stage 321-331. In contrast to other techniques that modify the bit values of samples under consideration, the only data that is modified at each stage of various embodiments is the "flag bit" or other in-play marker for each data sample 102. As the data samples 102A-B are fed through the data processing pipeline, then, multiple comparisons or other actions may be simultaneously and/or sequentially performed on the data without affecting later processing stages. As a result, some embodiments may implement multiple simultaneous filters 135 by simply adding additional "in play" bits in for each data sample 102, as well as additional output bits for each desired output.

The general pipeline structure shown in FIG. 3A may be modified or enhanced in any number of ways. Various embodiments may use "look ahead" techniques, for example, to further reduce computation times. In many implementations, it can be expected that a substantial amount of processing time may be consumed in counting the number of in-play bits having the desired value. Often, this count will be performed using logic similar to a conventional mutli-bit adder, a hamming distance calculator, or the like that can be time limited by ripple-carry delay and other factors. This delay may be reduced, however, by using carry lookahead techniques, by pre-calculating results for different possible outcomes in prior stages, by predicting results of prior stages (e.g., by predicting which samples 102 may remain "in play"), or using any other techniques. In such embodiments, the total time available to propagate results increases by the number of look-ahead stages, and selection of a final answer may be performed using a relatively low-latency multiplexer. Other techniques for streamlining or otherwise improving the performance of the pipelined structure may be implemented in any number of alternate but equivalent embodiments.

FIG. 3B shows a more detailed example in which the value of a desired rank 315 is determined for an exemplary dataset 110 that includes seven data samples 102A-G each having five data bits 301-305 that are serially considered in five processing stages 321-325. In this example, the rank 315 to be identified is the fourth rank, which happens to correspond to the median of this particular dataset 110. Equivalent embodiments, however, could seek out other ranks other than the median. This example could be readily adapted to consider other datasets 110 having any word length and/or any number of samples 102 as desired. Also, the seven data values are arranged in numerical order in FIG. 3B for clarity and ease of understanding. In practice, it the various values 102 do not need to be sorted or otherwise ordered prior to processing, since the in-play flag 111 is able to identify any of the various samples 102 that remain in consideration regardless of that sample's position within dataset 110.

As noted above, the process is initialized so that the desired rank 315 is identified, and so that all of the samples 102A-G are initially flagged as "in play". In this example, an in-play bit 111 is set for samples 102 that remain in play. The in-play bit 111 is then cleared when the associated sample 102 becomes no longer in play. Other embodiments may use different signaling or data representation schemes, as appropriate.

In stage 321, active bit 310 is the most significant bit (MSB) 301 of the dataset 110. At this initial stage 321, the rank being sought (#4) is greater than the number of zeros (2), so it can be readily deduced that the output bit for stage 321 will be a "1". That is, the sought rank 315 is greater than the number of zeros, so the output value of the desired rank must have a "1" in the MSB position 301. This value of "1" may be provided as the most significant active bit of the output 120, as desired. Further, all of the values 102 in dataset no that do not have a "1" as the active bit 301 (values 102F-G in this example) can be removed from further consideration by clearing the in-play bit in for those values. The count for the desired rank 315 is adjusted to account for the two values 102F-G that are no longer in play, and processing for the MSB 301 is complete.

Stage 322, then, seeks the second rank out of the five values 102A-E that remain in play by considering the next active bit 302. In the example of FIG. 3B, three values 102C-E have "zero" values on bit 302, so the number of zeros (i.e., 3) exceeds the sought rank (i.e., rank #2) for this stage 321. This means that the output bit for stage 321 is a zero, and that values 102A-B can be excluded from further consideration by clearing their in-play bits 111.

In stage 323, all three samples 102C-E that remain in-play have a "1" value on bit 302. The output bit for stage 323 is therefore a "1", and no values 102 are excluded from play. Since no values are excluded, the sought rank is not changed, and processing continues to consider the next bit.

Stage 324 continues to seek the second rank of the values 102C-E that remain in play by considering the fourth bit 304 as the active bit 310. In this example, value 102C has a "1" on bit 303, and values 102D-E have "0" values on bit 304. The output bit for stage 323 is therefore a zero, and value 102C (which has a "1" on bit 304) is excluded from further consideration by clearing the in-play flag 111.

In the final stage 325, then, the sought rank (rank #2) is equal to the number of zeros since both remaining values 102D-E are identical to each other. The output bit for stage 325 is therefore a zero, and the output value 120 of the fourth rank in dataset 110 is properly shown to be "10100". Again, this illustrative example may be supplemented or otherwise modified in any number of alternate embodiments.

Figure 4:
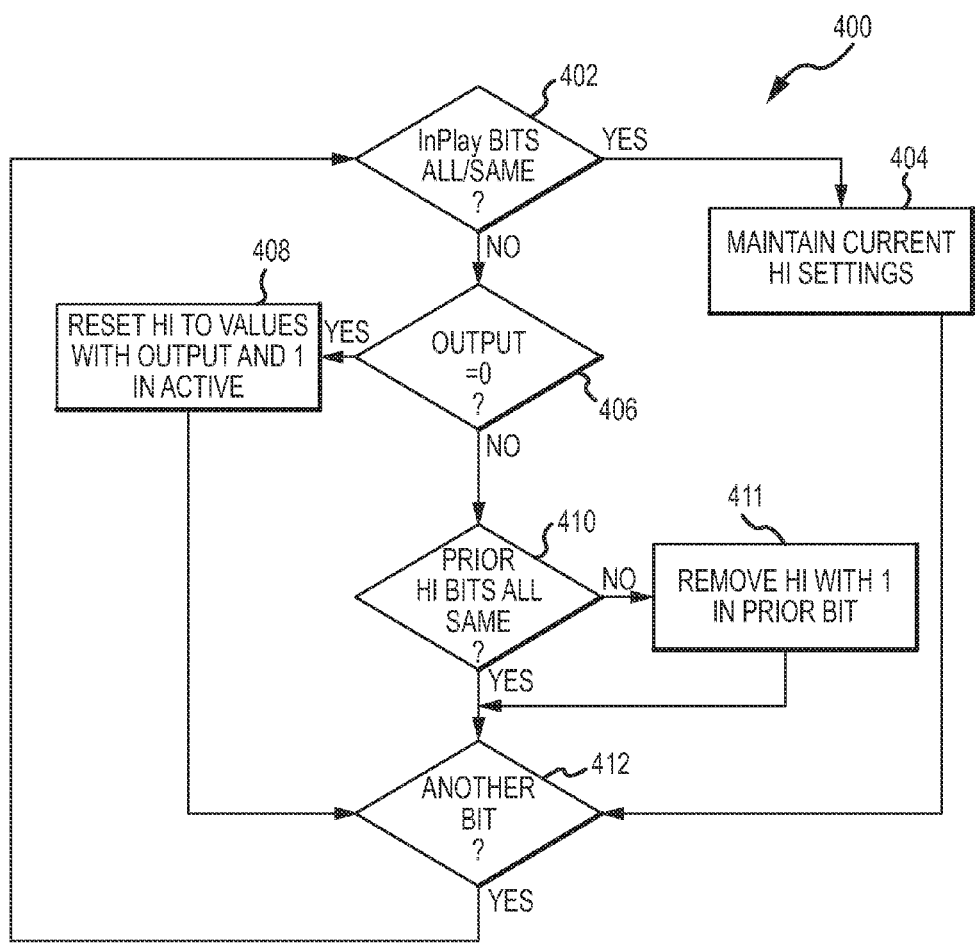
FIG. 4 is a flowchart showing an exemplary process for finding a "next highest" value in a dataset.

FIG. 4 shows an exemplary process 400 for tracking the "next highest" value during the iterative portion of the rank order filter. In some implementations, functions 402-410 may be implemented within function 213 of FIG. 2, although other embodiments may implement "next highest" features in any other manner.

Typically, each value 102 will be associated with an additional bit or other flag in that can be set (or cleared, as desired) to indicate when the associated value 102 is potentially the next-highest value. The "next highest" bit 111 is initially clear for each value 102 until a processing stage 321-325 identifies values 102 with different bit values on the relevant active bit for that stage.

If the active bits for all of the in-play values 102 are the same (function 402), then the previous "next highest" settings are maintained (function 404). If the active bits for the in-play samples 102 differ, however, then potential "next highest" values 102 can be determined based upon the value of the output bit provided from that processing stage 321-325. If the output bit is a zero (function 406), for example, then the next highest values can be determined to have the same value as the in-play samples 102, but with an active bit value of a one instead of a zero (function 408). Conversely, if the output value for the active bit is a one (function 408), then the more significant bits of the next-highest samples 102 will remain the same as the previous setting, if these bits are all identical to each other (function 410). If the active bits for the next-highest value are not identical, however, then the lower (zero) value can be maintained, and next-highest flag 111 can be cleared for those samples 102 having the higher (one) active bit value (function 411). Process 400 is repeated on each iteration of loop 206-220 (FIG. 2), as desired (function 412).

Figure 5:
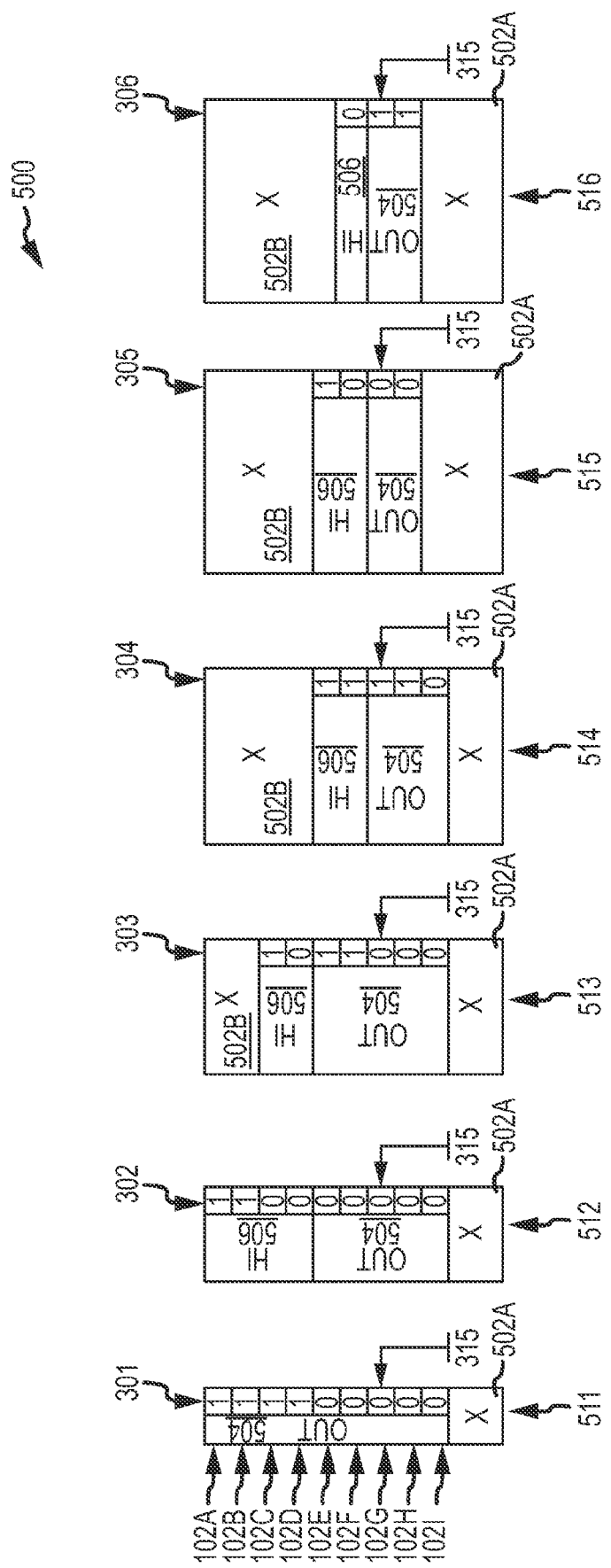
FIG. 5 is a diagram showing an example of how multi-stage processing can be used to find the next highest value in a dataset.

FIG. 5 provides an illustrative example of process 400 in which the "next highest" sample 102 that is greater than the fourth rank in the dataset no is sought. As noted in the discussion of FIG. 4, potential "next highest" samples 506 can be tracked with a "next highest" flag 111, as desired. As processing proceeds though stages 511-516 to consider bits 301 to 306 (respectively), the number of samples 102 that remain in-play 504 decreases until the value of the sought rank 315 is identified. Similarly, samples 102 that are potentially "next highest" decrease until the desired value is identified. In-play samples 504 and next-highest samples 506 may be identified using separate flags 111, as appropriate.

As noted previously, "next-highest" samples 506 may not be recognized until at least stage 511-516 recognizes two different values of the in-play samples 504. In the first stage 511 shown in FIG. 5, the output bit of the third rank is a "zero", but four samples 102A-D with active bit values equal to one are also present. Samples 102E-F with a "zero" value on bit 301 are therefore flagged as "in-play" 504, and samples 102A-D having an active bit 301 equal to a "1" are flagged as potentially "next highest" 506 for processing in stage 512.

Samples that are neither in play nor "next highest" may be further marked as out-of-play 502, as desired.

In stage 512, each of the in-play samples 102E-I has a common "zero" value for the active bit 302, so the more significant bits of the next-highest samples 504 do not change. Because the values of bit 302 differ between the next-highest samples, however, the samples 102A-B having the higher bit values can be excluded from further consideration. That is, since samples 102C-D are already identified as being greater than the in-play values, it can be deduced that the still greater values of samples 102A-B are not the "next highest". These samples 102A-B can therefore be considered out of play and no longer potentially "next highest", as indicated by region 502B of FIG. 5.

In stage 513, the output bit is a zero even though two in-play samples 102E-F have active bits 303 equal to one. These samples 102E-F are therefore identified as potentially next-highest 506, and samples 102C-D are removed from further consideration (region 502B). Samples 102C-D remain as potentially next-highest 406 through stage 514 because the output of stage 514 is a one, and because samples 102C-D both have the same value for bit 304. In stage 515, the equal values of bit 305 for samples 102G-H would dictate no change in next highest values 506, although sample 102E can be excluded, since it has a greater value than sample 102F. Sample 102F is then confirmed as the next-highest value 506 when the active bit 306 of stage 516 is identical for the remaining in-play samples 102F-G. The output 120 from this example therefore indicates that the sample 102G value of 000101 the sought rank value 315, and the next highest value is sample 102F, a value of 001100.

Various embodiments may equivalently provide a "next lowest" function or the like using similar techniques. A "next lowest" function may be implemented using techniques similar to those illustrated in FIGS. 4 and 5, but with the various comparisons modified to seek the lower value rather than the higher value. The "next highest" and/or "next lowest" functions may be used as an integrity check on the rank order filter in some implementations, or for any other purpose. Other embodiments may average the sought rank with the next highest or next lowest value (e.g., if desired to compensate for an even number of samples 102 in a dataset 110), as desired.

Figure 6:
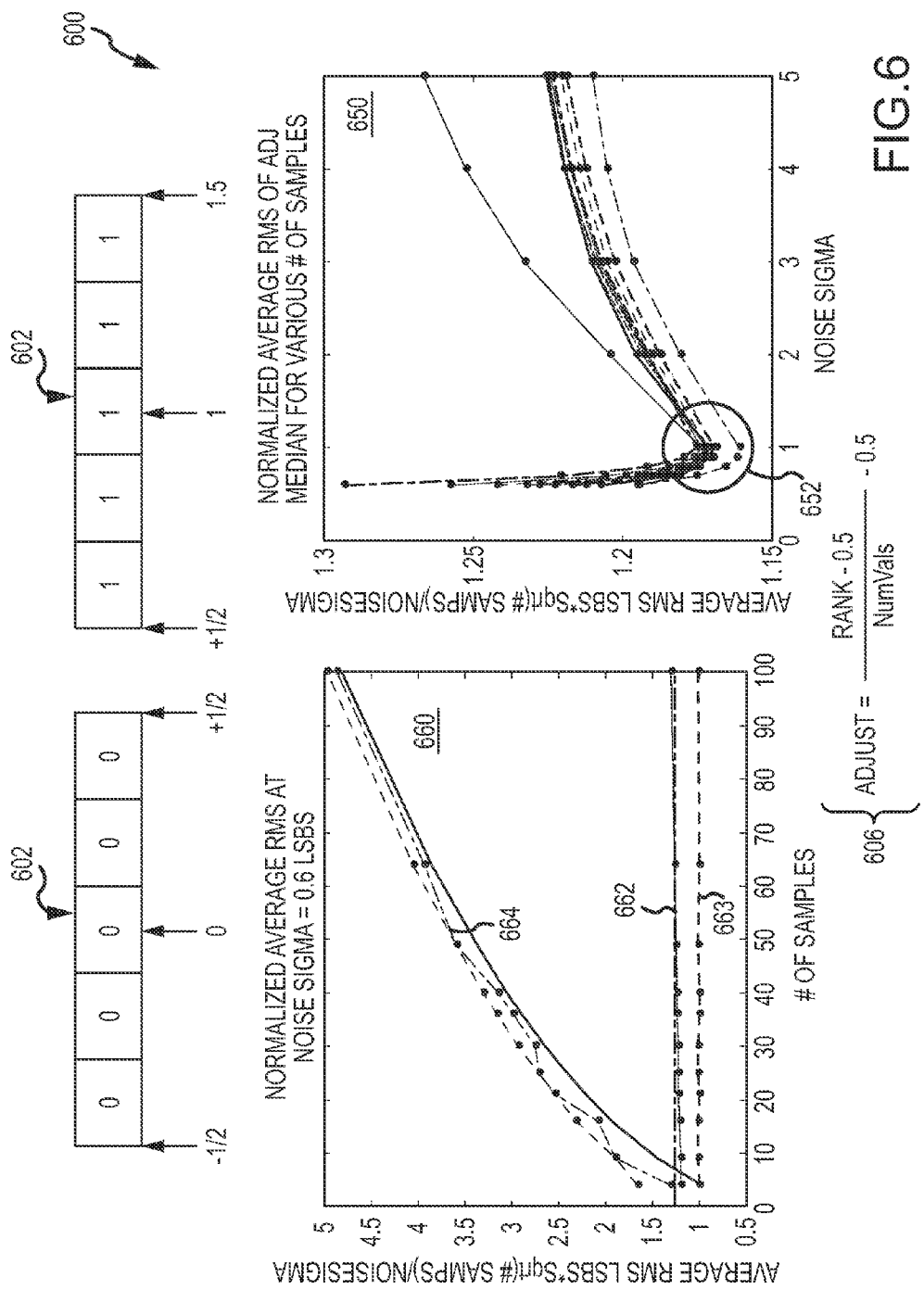
FIG. 6 is a diagram showing an exemplary process for performing least significant bit interpolation.

Various embodiments may provide post-processing (function 221 in FIG. 2) in any manner. FIG. 6, for example, shows an exemplary process 600 whereby the least significant bit (LSB) of the identified rank order value is interpolated with respect to other ranks having the same or similar values to reduce the effects of quantization/sampling issues, and to improve the resolution of the output 120. In such embodiments, degradations in signal-to-noise ratio (SNR) that are due to input quantization can be effectively smoothed by simply interpolating the LSB across an appropriate range. In the example of FIG. 6, the output bit from the LSB is simply compensated based upon the number of equivalent values that remain in-play in the final stage of rank order processing. If the output rank is found to be the middle of a range of equal values, for example, then the LSB can simply be output as-is. Plot 602 shows an example wherein five "zeros" remain in play in the final stage of LSB processing. If the output rank 315 is the central (third) rank of the five zero values, then the output would remain "zero", as appropriate. If the output rank 315 was not the central rank, however, then the output could be scaled to reflect the position of the output rank 315 with regard to the total number of equal values. If the output rank was the first rank of five "zero" outputs, for example, then the output may be scaled downward by the equivalent of a half bit value or so. Conversely, if the output rank was the fifth rank of the five "zero" values, then the output may be scaled upwardly by a half bit or so, as desired. Similar scaling could be applied if the output is a one, with the output rank's relative position within the set of equal output values determining the scaling of the output value as shown in plot 604. This scaling effectively implements a Equation 606 shows an algebraic example of how the output rank can be scaled based upon the number of equal in-play values in the active LSB; other equations or techniques may be equivalently applied, as desired. In the example of FIG. 6, however, the output rank 315 and the number of zeros and/or ones is already determined as part of the output logic, so the additional computation to provide an interpolated output may not be significant relative to the other data processing provided within data processing system 114.

This interpolation can dramatically improve the results obtained by the rank order filter, as shown in graphs 650 and 660. Graph 650 shows the normalized average noise resulting from a median filter that includes interpolation as described for various levels of quantization in the sample data. In this example, the optimum operating point would be near point 652, where the quantization most closely approximates the level of noise in the dataset. At noise levels to the left of point 652, noise quantization is large relative to the noise level itself, and the normalized average noise itself increases sharply as the quantization increases. Although noise also increases (toward an asymptote of 1.25 in this example) as quantization levels decrease to the right of point 652, the increase is less dramatic than to the left. This supports the conclusion that quantization levels should be designed to be close to the noise level. Moreover, graph 650 clearly supports the relatively surprising conclusion that in this case under-quantization is generally preferred to over-quantization.

Turning to graph 660, an exemplary plot of the normalized average noise is shown for various types of filters and different numbers of samples. From graph 660, it can be readily seen that the performance 662 of the adjusted median filter is relatively constant for various sample sizes, and only slightly less favorable than the performance 663 of a comparable mean filter. Interestingly, the performance 662 of the adjusted median filter with quantized inputs was uniformly better than the performance 664 of the median filter with real-valued inputs. This leads to the relatively surprising result that the interpolation described above not only overcomes the effects of quantization error, but does better than a real-valued median filter in some implementations. In particular, graph 660 demonstrates the unexpected conclusion that it may be beneficial in some situations to increase the coarseness of the input quantization before filtering when the noise is too much larger than the LSB. That is, lower resolution input may, in such cases, provide a more accurate result than higher resolution input.

As noted at the outset, various embodiments may additionally or alternately compute bounded averages of rank values lying between to particular ranks of the dataset. This average, while useful in summarizing pixel values or other data samples 102 while excluding the effects of relatively high (or low) magnitude noise signals, has previously proven to be relatively difficult to implement, particularly in programmable gate arrays or other custom hardware.

Figure 7:
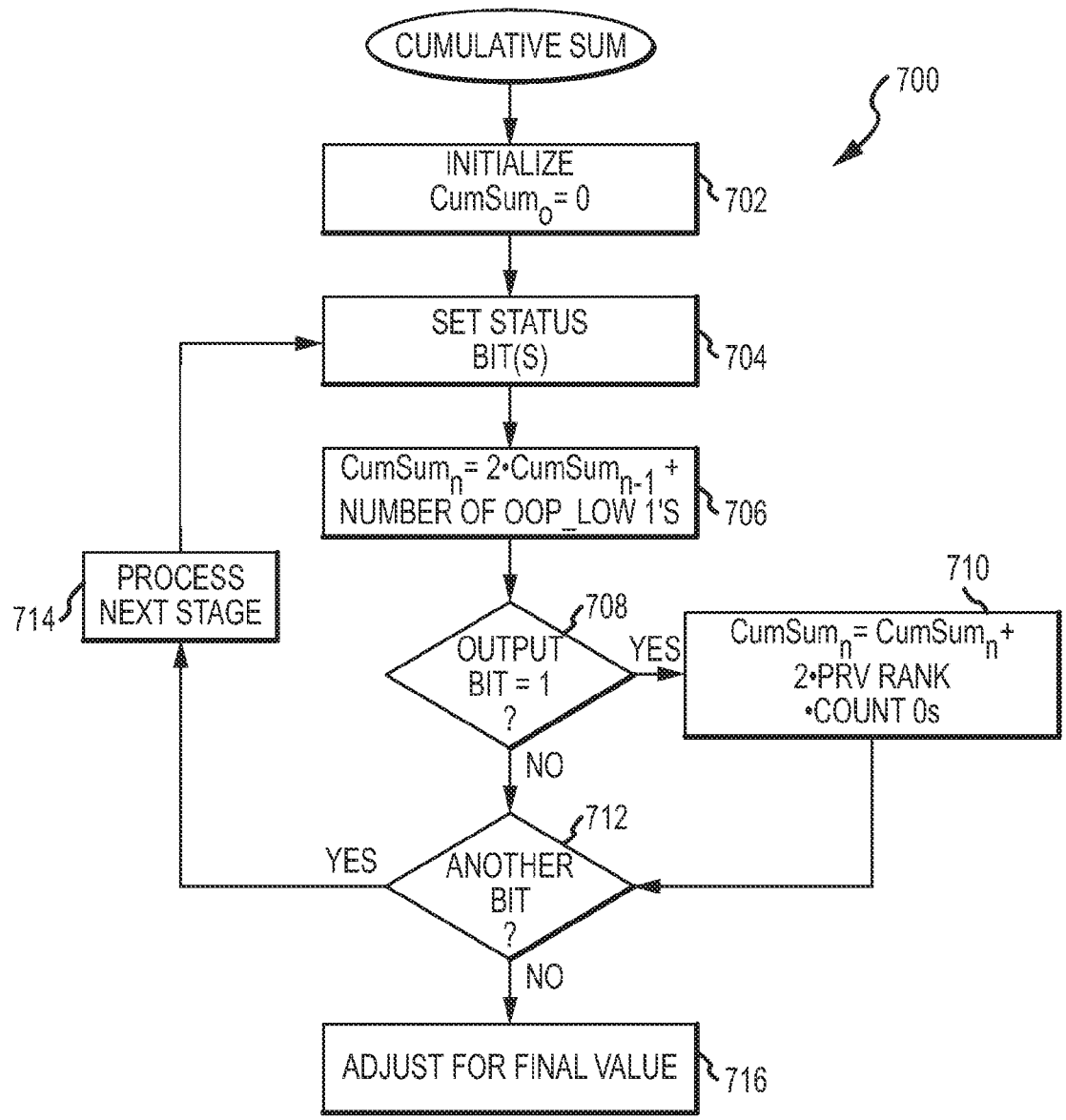
FIG. 7 is a flowchart showing an exemplary process for computing a cumulative sum of the ranks below the rank of interest.

Various embodiments therefore supplement the general rank order process described in conjunction with FIGS. 2-3 above by maintaining a cumulative total of the values that lie below the desired output rank. FIG. 7 shows one technique for efficiently summing the cumulative values of the samples 102 that lie below the desired rank 315. Such a process 700 may be implemented in the context of function 215 of FIG. 2, or in any other manner.

As shown in FIG. 7, a cumulative sum is initially set to zero (function 702). This sum is updated during processing to reflect the additional values stored in the active bits, particularly in the samples 102 that are not in play and that are below the rank of interest. To that end, samples 102 may be associated with one or more additional bits or other flags in that indicate that the sample is both out-of-play and below the selected rank 315 (function 704). Various embodiments may use two bits 111 to represent up to four states (e.g., "in play", "out of play-high", "out of play-low", and "next highest"). Other embodiments may use additional bits in for better data integrity, ease of signal processing, and/or for any other purpose. The status bits set in function 704 therefore indicate those ranks that are both out of play and below the target rank 315.

The cumulative sum is updated on each processing stage to reflect the total values of ranks that are less than the target rank 315 (function 706). In various embodiments, this cumulative sum can be maintained by simply multiplying the previous cumulative sum (i.e., the sum for the more significant bits that have already been accumulated in early stages) by two, and then adding the ones that are present in the active bit of the relevant "low and out of play" ranks. The prior sum is multiplied by two (or logically shifted one bit to the left) to reflect that the prior cumulative sum was calculated from bits that are more significant than the active bit. The total number of "ones" from active bits of the low out-of-play ranks is then added to the shifted sum to reflect the value of the then-current active bit. Since addition is a commutative property, it is not typically necessary to track the particular values that have "zero" or "one" values for the active bit; it is sufficient to simply note the total number of ones occurring within the relevant ranks, and then add this number to the cumulative sum.

If the output bit for the then-current active bit is a "one" (function 708), then additional values will be added to the cumulative sum to reflect the total value of the additional ranks that have newly-become "low out-of-play" ranks during the current processing stage (function 710). In various embodiments, the value of these additional ranks simply corresponds to the prior output values from the previously-considered stages multiplied by two (or logically shifted a bit to the left), and then further multiplied by the number of previously in-play ranks that have zeros in the active bit.

The cumulative sum is updated on each iterative processing stage (function 712) so that the cumulative sum reflects values from each bit of the dataset 110. Status bits 111 are updated following processing of each stage (function 714) to reflect any newly-out-of-play ranks, and the value is updated as appropriate until each bit has been considered. Various embodiments may further add scaling or other adjustments after all of the bits have been considered, as desired (function 716). Some implementations may add the value of the target rank 315, for example, as desired for the particular application.

Figure 8:
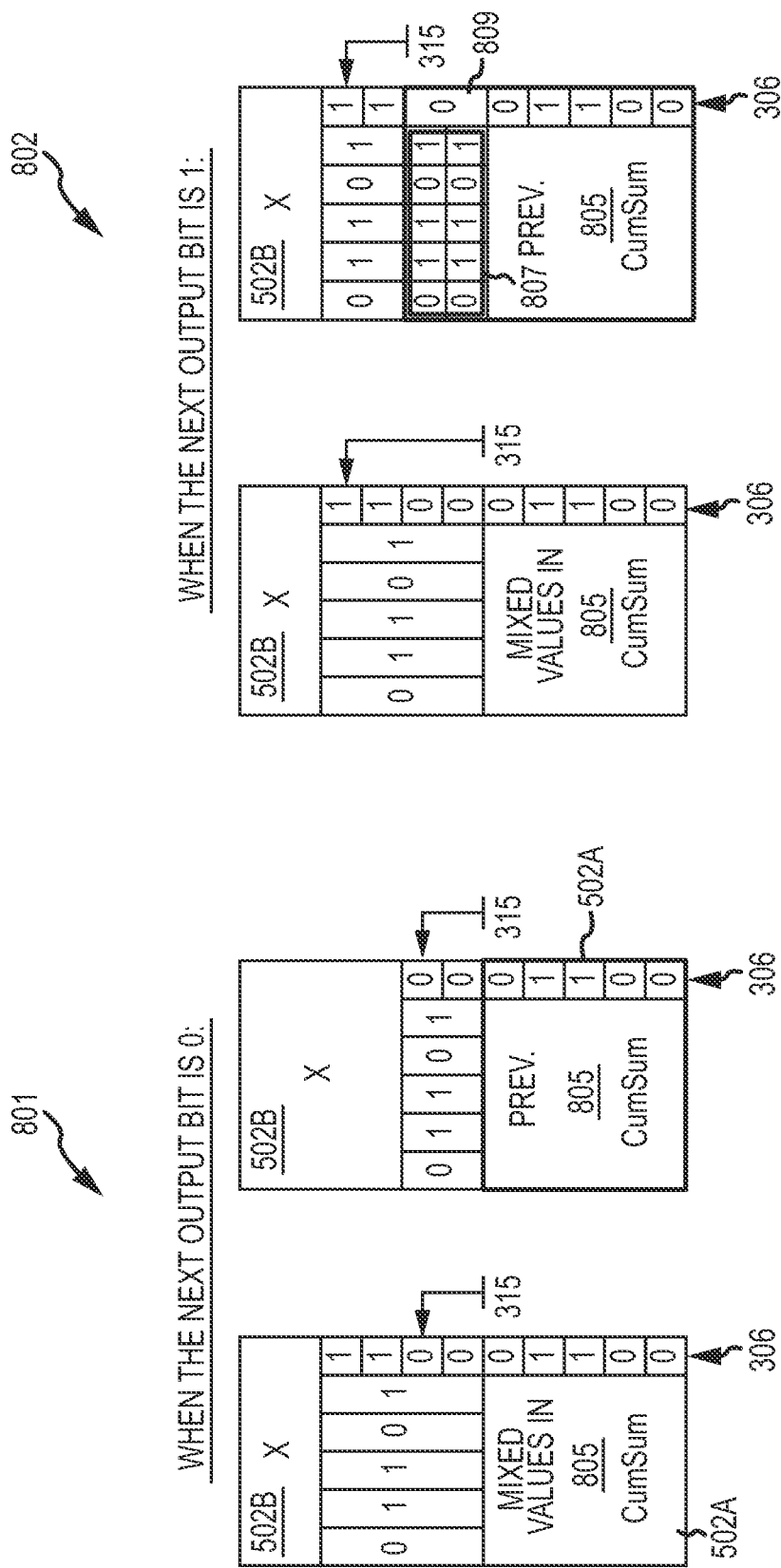
FIG. 8 is a diagram showing an example of how a cumulative sum may be computed.

FIG. 8 shows two exemplary scenarios 801, 802 in which a cumulative sum 805 is calculated during the iterative identification of a target rank value 315. In the scenario 801 toward the left of FIG. 8, the output value for bit 306 is a zero, so no additional ranks are added to the "in play low" section 502A. The cumulative sum 805 from the prior processing stage generally includes the values of the more significant bits 801-804, so this prior cumulative sum 805 would be multiplied by two (or shifted to the left) and the values of all of the low out-of-play ranks are added. In the example shown in scenario 801, only two low out-of-play ranks have "one" values in active bit 306, so a value of two would be added to the prior cumulative sum 805. The in-play ranks having an active bit 306 equal to one are removed from play in subsequent iterations, but these ranks have a value that inherently exceeds that of the target rank 315. These ranks are therefore added to the out-of-play high section 502B, and the values are not considered in the cumulative sum 805.

Scenario 802 illustrates a similar situation when the active bit 306 provides an output value of one. In this instance, the in-play values 102E and 102F are flagged as no longer in play, and as being less than the target rank 315. In addition to adding the values from active bit 306, then, the cumulative sum needs to consider the values added by ranks 807. Because these ranks 807 were previously in play, however, the more significant bits of these values will be known to be equal to the output values that have been determined in the prior iterations. Further, it is known that the number of ranks 807 being added is equal to the number of previously in-play ranks 102 having zero values in the active bit 306, which is often a quantity that has been previously calculated. By simply multiplying the number of in-play zeros by the value of the output bits (scaled as necessary), then, the full value of the newly-added ranks can be conveniently considered. Many other embodiments may supplement or modify this process, as desired.

Figure 9:
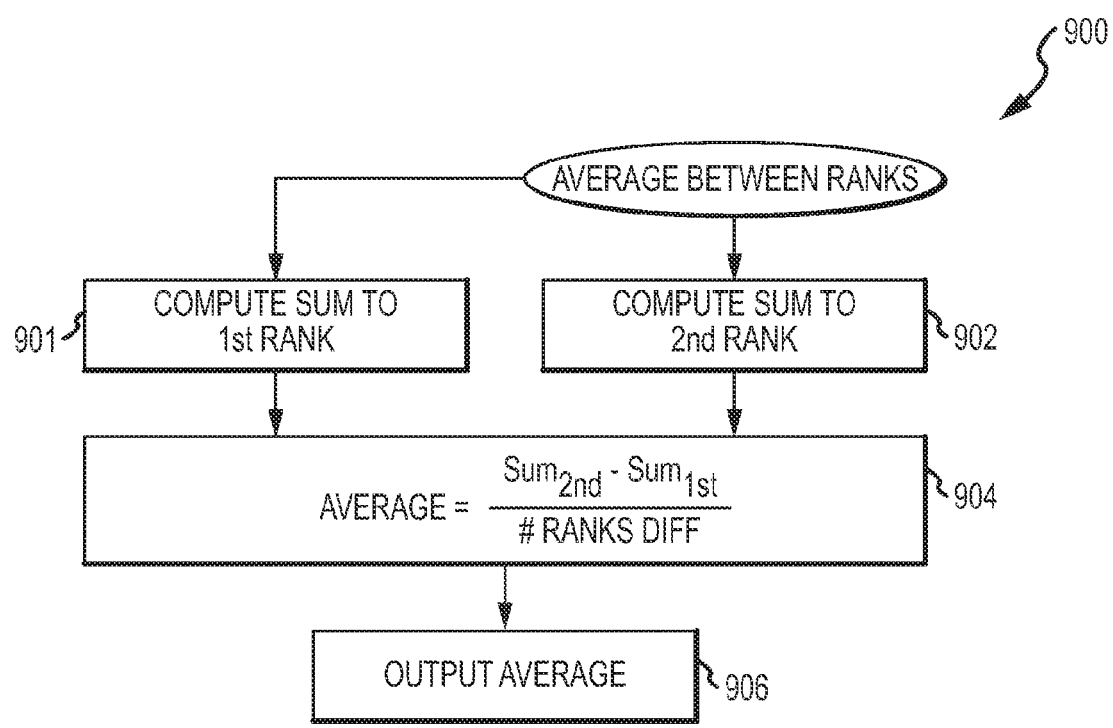
FIG. 9 is a flowchart of an exemplary process for determining an average of the values lying between two ranks in a dataset.

The cumulative sum feature may be used for any number of different purposes, such as to compute a bounded average value for certain values in dataset 110 that lie between two particular ranks. FIG. 9 shows an exemplary process 900 for finding a bounded average. Generally speaking, two different rank values 315 are identified using rank order filters 135A-C or the like, and cumulative sums 805 for each rank are computed as described above (functions 901, 902). The two different values 315 and their cumulative sums may be computed in series or parallel, as desired.

To compute the average value of the ranks 102 falling between the identified upper and lower ranks, then, the cumulative sum of the lower rank is subtracted from the cumulative sum of the upper rank (function 904). This difference may then be divided by the number of active ranks that separate the two values to arrive at the average of the intervening ranks. This average may be provided as output 130 or the like, as desired (function 906). The particular algorithms or techniques used to computing the bounded average may be modified or supplemented as desired.

Various systems and techniques for processing data are therefore described. As noted at the outset, these techniques and systems may be variously applied in any military, industrial, commercial, personal or other setting for image enhancement, target/object recognition, signal processing, filtering and/or other benefits as appropriate. Any number of modifications and enhancements could be formulated from the various examples described herein.

As used herein, the word "exemplary" means "serving as an example, instance, or illustration". "Exemplary" embodiments are not intended as models to be literally duplicated, but rather as examples that provide instances of embodiments that may be modified or altered in any way to create other embodiments. Any implementation described herein as "exemplary" is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. Various changes may be made in the function and arrangement of elements described without departing from the scope of the invention and its legal equivalents.

What is claimed is:

1. A method executable by data processing hardware to find an output value of a desired rank in a set of data samples, wherein each of the data samples comprises a set of digital bits each having either a first value or a second value and wherein the output value is represented by a set of output bits each having either the first value or the second value, the method comprising the steps of:
   receiving each of the data samples in the data set at the data processing hardware;
   for each of the digital bits, sequentially treating the bit as an active bit and computing a value of one of the output bits based upon the values of the active bits of the data samples, wherein the computing for each active bit comprises:
      determining the value of the output bit based upon a comparison of the desired rank with a count of the data samples that remain in consideration and that have a value of the active bit equal to the first value;
      if the comparison indicates that the value of the output bit is the first value, then excluding all data samples having the active bit equal to the second value from further consideration; and
      if the comparison indicates that the value of the output bit is the second value, then adjusting the desired rank and excluding all data samples having the active bit equal to the first value from further consideration; and
   after computing the output values of each of the output bits, outputting the output value from the computed output bits.

2. The method of claim 1 wherein the computing comprises:
   determining the count of the number of data samples that remain in consideration and that have the value of the active bit equal to zero as the first value;
   if the count is less than the desired rank, providing a one as the value of the output bit, treating each of the data samples having the value of the active bit equal to zero as no longer in consideration, and increasing the desired rank to account for the data samples that are no longer in consideration; and
   if the count is greater than or equal to the desired rank order, providing zero as the value of the output bit, and treating each of the data samples having the value of the active bit equal to one as no longer in consideration.

3. The method of claim 1 wherein the computing comprises:
   determining the count of the number of data samples that remain in consideration and that have the active bit equal to one as the first value;
   if the count is greater than or equal to the desired rank order, then providing one as the value of the output bit, treating each of the data samples having the output bit equal to zero as no longer in consideration; and
   if the count is less than the desired rank order, then providing zero as the value of the output bit, treating each of the data samples having the value of the output bit equal to one as no longer in consideration, and decreasing the desired rank to account for the data samples that are no longer in consideration.

4. The method of claim 1 further comprising associating each of the data samples in the data set with an inplay bit that is initially set so that the data sample remains in consideration.

5. The method of claim 4 further comprising excluding at least one data sample from the data set by clearing the inplay bit associated with the excluded data sample prior to the computing step.

6. The method of claim 1 wherein the computing step further comprises tracking a next-highest value of the rank order.

7. The method of claim 6 wherein the tracking step comprises:
   determining if all of the data samples remaining in consideration are equal to each other;
   if all of the data samples remaining in consideration are equal to each other, maintaining a current next-highest value for the active bit;
   if all of the data samples remaining in consideration are not equal to each other, then maintaining the current next-highest value for the active bit if the output for the active bit is the second value, and otherwise resetting the current next-highest value to correspond to the outputs of the prior iterations of the computing step for each of the prior active bits with the second value as the next highest value.

8. The method of claim 1 wherein the computing step further comprises tracking a next-lowest value of the rank order.

9. The method of claim 8 wherein the tracking step comprises:
   determining if all of the data samples remaining in consideration are equal to each other;
   if all of the data samples remaining in consideration are equal to each other, maintaining a current next-lowest value for the active bit;
   if all of the data samples remaining in consideration are not equal to each other, then maintaining the current next-lowest value for the active bit if the value of the output bit is the first value, and otherwise resetting the current next-lowest value to correspond to the outputs of the prior iterations of the computing step for each of the prior bits with the first value as the next lowest value.

10. The method of claim 1 further comprising interpolating a value of the least significant bit of the output value prior to the outputting step.

11. The method of claim 10 further comprising, prior to the interpolating, adjusting a quantization level of the least significant bit.

12. The method of claim 11 wherein the quantization level is adjusted to match a level of noise in the set of data samples.

13. The method of claim 10 wherein the interpolating comprises scaling the output value as a function of the relative position of the desired rank within the final run of identical values.

14. The method of claim 1 further comprising maintaining a cumulative sum of the active bits of data samples that are below the desired rank.

15. The method of claim 14 wherein the maintaining comprises tracking data samples having values that are less than the value of the desired rank.

16. The method of claim 14 wherein the maintaining comprises setting a flag associated a particular data sample if the particular data sample is found in the iterative processing step to be below the desired rank.

17. The method of claim 1 further comprising, for each iteration of the computing step, maintaining a cumulative sum of the active bits for those data samples that are beyond the desired rank.

18. The method of claim 17 wherein the maintaining comprises multiplying the cumulative sum from the previous iteration by two and adding the number of data samples that are below the desired rank and that have an active bit equal to the second value.

19. The method of claim 17 wherein the maintaining further comprises, when the output for the active bit is the second value, additionally adding to the cumulative sum the value of the output bits from the prior iterations multiplied by two times the number of in play data values having active bits equal to the first value.

20. A computational system to find an output value of a desired rank in a set of data samples, wherein each of the data values comprises a set of digital bits each having either a first value or a second value, the system comprising:
an output interface; and
data processing circuitry configured to receive the set of data samples, to compute the output value to include one output bit from each active bit in the set of digital bits, and to provide the output value from the output bits provided for each active bit via the output interface, wherein the computing for each of the active bits comprises:
determining a count of the number of data samples that remain in play and that have the active bit equal to the first value;
if the count is not less than the desired rank, providing the first value as the output bit for the active bit and treating each of the data samples having the active bit equal to the second value as no longer in play; and
if the count is less than or equal to the desired rank order, providing the second value as the output for the active bit, treating each of the data samples having the active bit equal to the first value as no longer in play, and adjusting the desired rank to account for the data samples that are no longer in play.

21. The system of claim 20 wherein the data processing circuitry is at least partially implemented in a configurable gate array.

22. The system of claim 21 wherein the configurable gate array comprises an input portion configured to receive the set of data samples, a first rank order filter configured to determine the output value of the desired rank from the set of data samples, and a second rank order filter configured to simultaneously determine a second output value of a second desired rank from the set of data samples.

23. The system of claim 22 wherein the first rank order filter is configured to maintain, for each iteration of the iterative computing step, a first cumulative sum of the active bits for those data samples that are below the desired rank and the second rank order filter is configured to maintain a second cumulative sum of the active bits for those data samples that are below the second desired rank.

24. The system of claim 22 wherein the data processing circuitry is further configured to compute an average of values of the data samples between the desired rank and the second desired rank based upon the first and second cumulative sums.

25. The system of claim 20 wherein the data processing circuitry is further configured to interpolate a value of the least significant bit of the output value.

26. The system of claim 20 wherein the data processing circuitry is further configured to adjust a quantization level of the least significant bit prior to the interpolating.

27. The system of claim 20 wherein the quantization level is adjusted to match a level of noise in the set of data samples.

28. The system of claim 20 wherein the data processing circuitry is further configured to interpolate the least significant bit of the output value based on the desired rank within the samples in consideration and based upon the number of data samples in consideration having a least significant bit equal to the least significant bit of the output.

29. The system of claim 20 wherein the processing circuitry is organized in a pipelined fashion such that each of the data samples is processed in parallel, and wherein the output value is computed from a series of processing stages each providing one of the active bits for the output value.

30. The system of claim 29 wherein a most significant bit for each of the data samples is discarded after each of the processing stages is complete.

31. The system of claim 20 wherein the data processing circuitry comprises an input portion configured to receive the set of data samples, a first rank order filter configured to determine the output value of the desired rank from the set of data samples, and a second rank order filter configured to simultaneously determine a second output value of a second desired rank from the set of data samples.

32. The system of claim 31 wherein the data processing circuitry is organized in a pipelined fashion such that each of the data samples is processed in parallel by a common series of processing stages each simultaneously providing one of the active bits of the output value and of the second output value.

* * * * *